United States Patent [19]
An

[11] Patent Number: 5,862,428
[45] Date of Patent: Jan. 19, 1999

[54] APPARATUS FOR DETACHABLY MOUNTING A LENS FILTER ONTO A CAMERA

[76] Inventor: Sung-Kyun An, 355-101, Jukong Apartment, 20-9, Banpo-dong, Seocho-Ku, Seoul, Rep. of Korea

[21] Appl. No.: 921,912

[22] Filed: Sep. 2, 1997

[30] Foreign Application Priority Data

Sep. 2, 1996 [KR] Rep. of Korea .................. 1996 37819
Jan. 25, 1997 [KR] Rep. of Korea ..................... 1997 2185

[51] Int. Cl.$^6$ .................................................. G03B 11/00
[52] U.S. Cl. ......................... 396/544; 359/889; 359/892
[58] Field of Search ................................. 396/544, 545, 396/340; 359/889, 892

[56] References Cited

U.S. PATENT DOCUMENTS

| | | |
|---|---|---|
| 3,967,301 | 6/1976 | Corning . |
| 3,996,598 | 12/1976 | Sansone ................................ 396/544 |
| 4,752,798 | 6/1988 | Chrosziel . |
| 4,901,098 | 2/1990 | Salles .................................... 396/544 |
| 4,918,475 | 4/1990 | Edwards . |
| 5,349,411 | 9/1994 | Beauviala ............................... 396/544 |

FOREIGN PATENT DOCUMENTS

| | | |
|---|---|---|
| 955039 | 6/1995 | Rep. of Korea . |
| 955049 | 6/1995 | Rep. of Korea . |
| 2108696 | 10/1981 | United Kingdom . |

*Primary Examiner*—Alan A. Mathews
*Attorney, Agent, or Firm*—Ostrolenk, Faber, Gerb & Soffen, LLP

[57] ABSTRACT

Disclosed is an apparatus for mounting a lens filter on a camera. The apparatus includes a fixing plate which can rotate and slide according to the position of the accessory mounting groove of the camera and combines with the accessory mounting groove of the camera. An adjusting part adjusts the horizontal position of a filter according to the variation of the length of a camera lens. The adjusting part is slidably combined with the fixing plate. A filter holder assembly which is rotatably mounted on the adjusting part is included. The filter holder assembly receives a filter and adjusts the vertical position of the filter according to the vertical position of the camera lens. A picture can be taken irrespective of the position of the camera lens and the position of the accessory mounting groove. A circular filter and a rectangular filter can be used.

14 Claims, 16 Drawing Sheets

APPARATUS FOR DETACHABLY MOUNTING A LENS FILTER ONTO A CAMERA

BACKGROUND OF THE INVENTION

1. Field of the Invention

The present invention relates to a camera accessory, and more particularly to an apparatus for detachably mounting a lens filter onto a camera.

2. Description of the Prior Art

As for accessories for a camera, a tripod for preventing the shaking of the camera, a flash for lighting up a thing pictured for photographing in a dark environment, various filters for improving a photographing technique, such as an ultraviolet (UV) filter for shielding UV irradiated through a camera lens, can be illustrated. A camera lens is demountably attached in front of the objective lens for filtering the light which irradiates film through the objective lens or for modifying the thing image of the object captured the film) to produce various effects on the pictured image.

Generally, a camera may be classified as either an auto-focusing camera, which automatically adjusts the focus or a manual-focusing camera, which the user adjusts the focus manually. Manual-focus cameras adjust the focus while confirming the object viewed through a viewfinder which is related to the objective lens. On the other hand, an auto-focus camera adjusts the focus while confirming the object viewed through a viewfinder which is separate from the objective lens. Accordingly, the image of the object viewed may be confirmed during photography when using a manual-focus camera. Whereas, the camera image of the object viewed is not identical with the view of the object through the viewfinder when using an auto-focus camera.

A filter used with the manual-focus camera may be demountably fastened in front of the front surface of the objective lens. The objective lens for the manual-focus camera has a screw for mounting the lens filter and the lens filter has another screw. Accordingly, the lens filter can be easily mounted to the camera lens. However, there is no apparatus for demountably fastening a filter in front of the objective lens of an auto-focus camera and so a user of an auto-focus camera cannot utilize filters for improving the quality of his pictures.

In order to solve the above-mentioned problem, apparatuses are disclosed in Korean Utility Model Publication Nos. 95-5049 and 95-5039 entitled "Holder assembly for Camera Filter" and "Holder assembly for Camera Lens Filter", respectively, published on Jun. 21, 1995.

FIGS. 1 & 2 illustrate the holder assembly for a camera lens filter disclosed in the Korean Utility Model Publication No. 95-5039. As shown in the drawings, a holder assembly 100 for camera lens filter 52 includes a support 20 to be combined with camera 10, a fixing screw portion 30 formed at one side of support 20, and a filter holder assembly 50 which is supported by support 20 through a hinge portion 40 and rotates. Fixing screw portion 30 is meshed with an accessory mounting groove (not shown) formed on the bottom surface of camera 10 for fixing camera 10 onto a tripod (not shown). Through this, support 20 is mounted onto camera 10. Filter holder assembly 50 rotates about the hinge formed at the distal end of support 20. Then, filter holder assembly rotates to the original position where is in parallel with support 20 when the camera lens protrudes forward for utilizing a zoom function, as shown in FIG. 2. At filter holder assembly 50, an inserting groove 54 is formed for receiving a filter 52.

However, as described in "Holder assembly for Camera Lens Filter" (see above), the length of support 20 is constant and the position of filter 52 is constant. Therefore, when using a camera having a different lens position or when using the zoom function, the above holder assembly for the camera lens in this publication cannot be used. If the user particularly wishes to use the filter in these circumstances, the user should hold filter 52 with one hand for positioning filter 52 in front of the lens. At this time, if the hand holding filter 52 trembles, filter 52 cannot be accurately positioned in the front of the objective lens. Moreover, if the hand is placed over the lens, the desired image cannot be captured.

In addition, the accessory mounting groove of the camera is generally formed at the left or right bottom surface of the camera. However, since the position of fixing screw portion 30 for fixing support 20 onto the camera is fixed in "the holder assembly for the camera lens filter", this holder assembly cannot be used for the camera having the accessory mounting groove formed at a different position.

SUMMARY OF THE INVENTION

Accordingly, it is an object of the present invention to provide an apparatus for mounting a filter which may be advantageously used for any camera irrespective of the vertically or horizontal position of a camera lens, or the position of the accessory mounting groove of the camera.

To accomplish the object of the present invention, there is provided in the present invention an apparatus for mounting a filter on a camera comprising:

a fixing means for fixing the apparatus to an accessory mounting groove formed at a bottom surface portion of the camera;

an adjusting means, slidably connected with the fixing means and provided with a hinge at one end portion of the adjusting part, for adjusting a horizontal position of a filter according to a distance variation between a camera lens and the camera so that a distance between the cameral lens and the filter is substantially constant; and a filter holder assembly for receiving the filter, the filter holder assembly being rotatably connected to the hinge.

In the present invention, the fixing means comprises a guiding member having a first guiding protrusion which is protrusively formed at a bottom surface of an upper portion of the guiding member, both ends of the guiding member being opened; a fixing plate which is rotatably and slidably connected to the guiding member and has a longitudinal hole formed at an inner portion of the fixing plate along a length direction of the fixing plate for receiving the first guiding protrusion, a first groove formed at a bottom surface around the long hole, a second groove formed at one end portion of the fixing plate and a through hole formed at a center of the second groove; and a fixing screw which passes through the through hole and is rotatably connected to the fixing plate, for combining the fixing plate with the accessory mounting groove of the camera.

The adjusting portion includes a first link which is slidably combined with the fixing portion, a second link which is slidably combined in the first link, and a stopping portion which is positioned in the first link and prevents the sliding of the second link.

The filter holder assembly includes a rotating member which is rotatably mounted on the adjusting portion and a filter holder which is slidably mounted on the rotating member and receives the filter.

According to the present invention, a user fixes the apparatus for mounting the filter onto the camera and can adjust the adjusting portion to fit the length of the camera lens. Then, the height of the filter fixing portion is adjusted to the height of the camera lens and a desired picture can be taken. Accordingly, the user can freely use the apparatus for mounting the filter irrespective of the kind of the camera, the position and the length of the camera lens and the position of the accessory mounting groove.

In addition, when the user advances the camera lens for utilizing a zoom function without adjusting the position of the filter to the length of the camera lens, the camera lens revolves the fixing portion of the filter with the hinge as a center. Therefore, the camera lens can advance without damaging the camera lens or the fixing apparatus of the filter.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
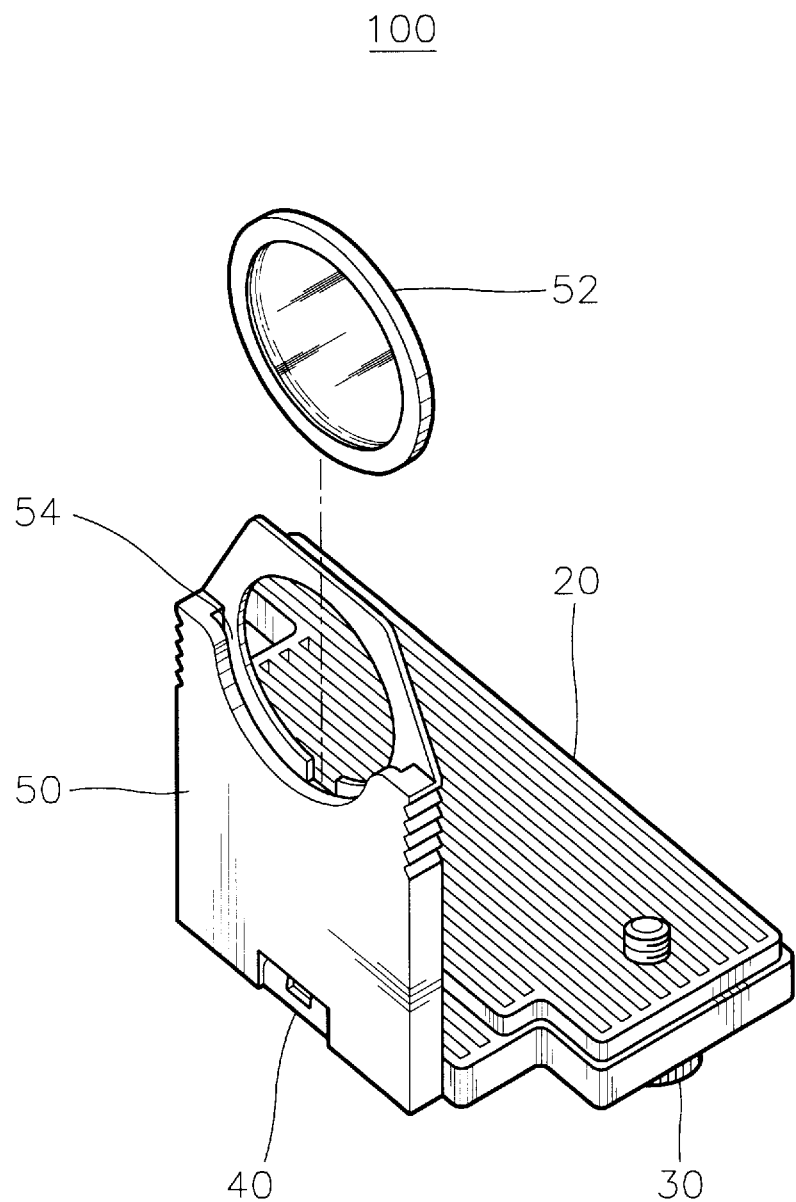
FIG. 1 is a perspective view of a the conventional holder assembly for a camera lens filter.
Figure 2:
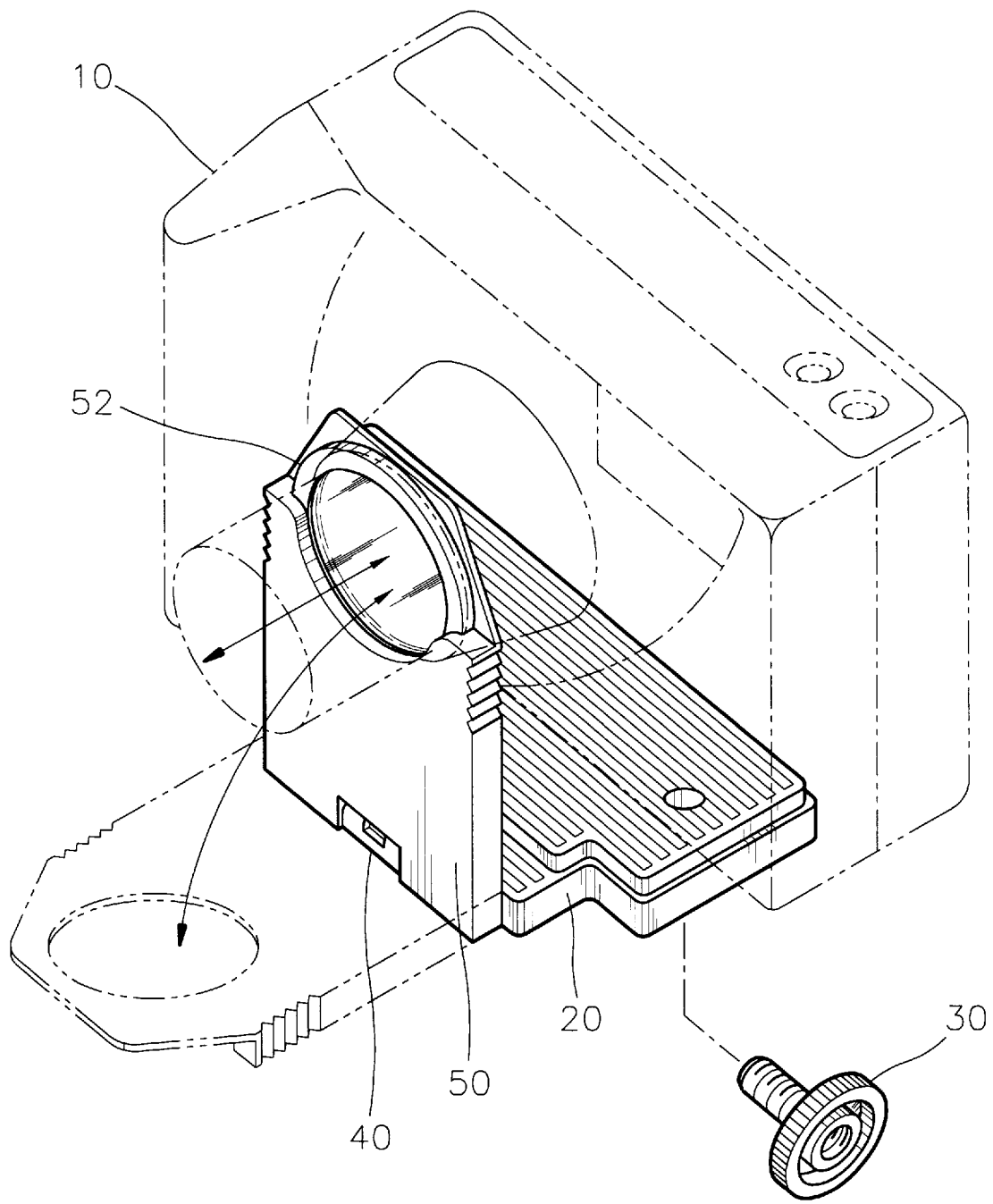
FIG. 2 is a perspective view of the holder assembly shown in FIG. 1, for explaining the mounting state of the holder assembly on the camera.

Hereinafter, the constituting elements and the operation principles according to preferred embodiments of the present invention will be explained in more detail with reference to the accompanying drawings. In the drawings, the same reference numerals are given to the same elements.
Embodiment 1

Figure 3:
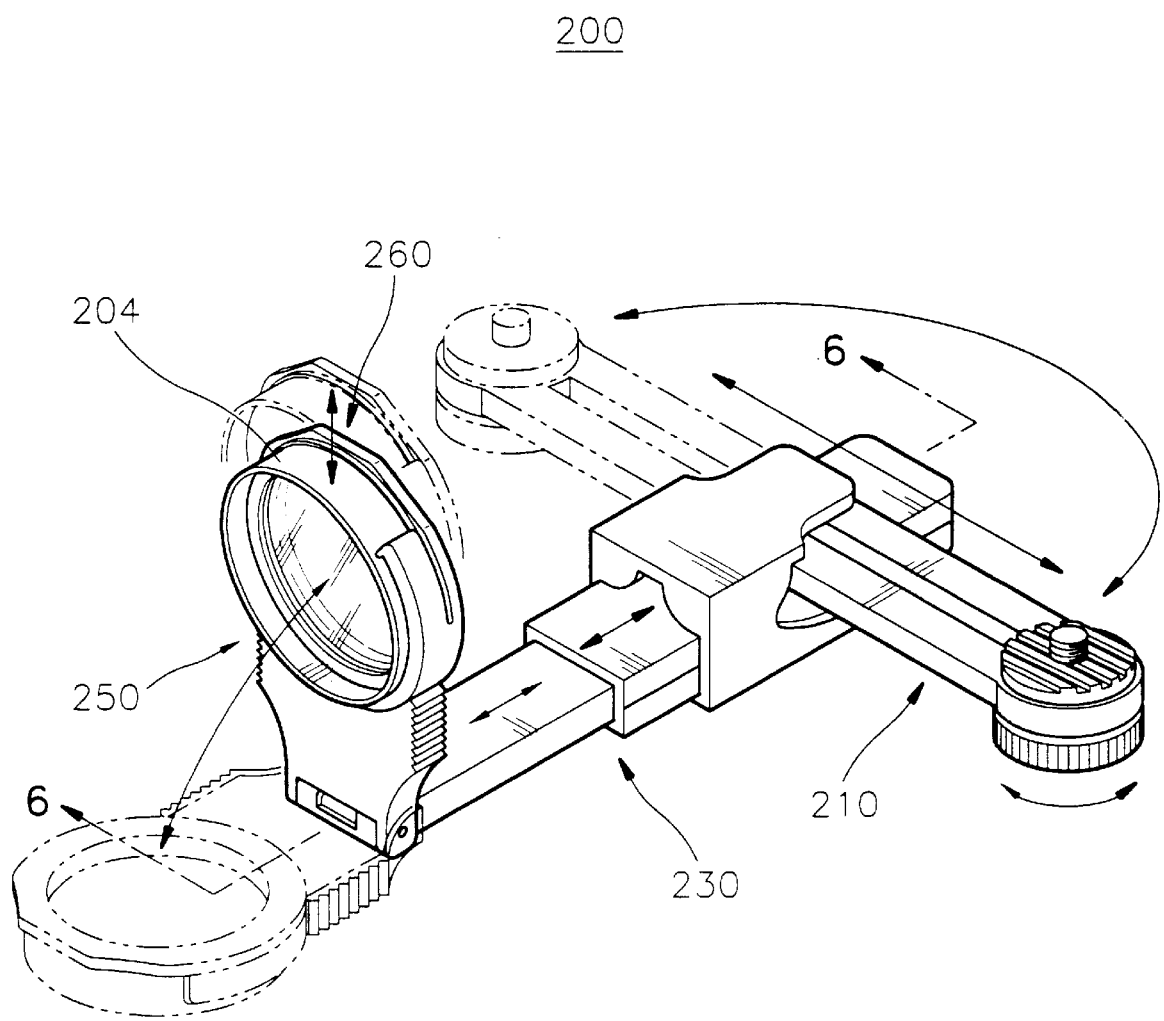
FIG. 3 is a perspective view of an apparatus for mounting a camera lens filter according to a first embodiment of the present invention.
Figure 4:
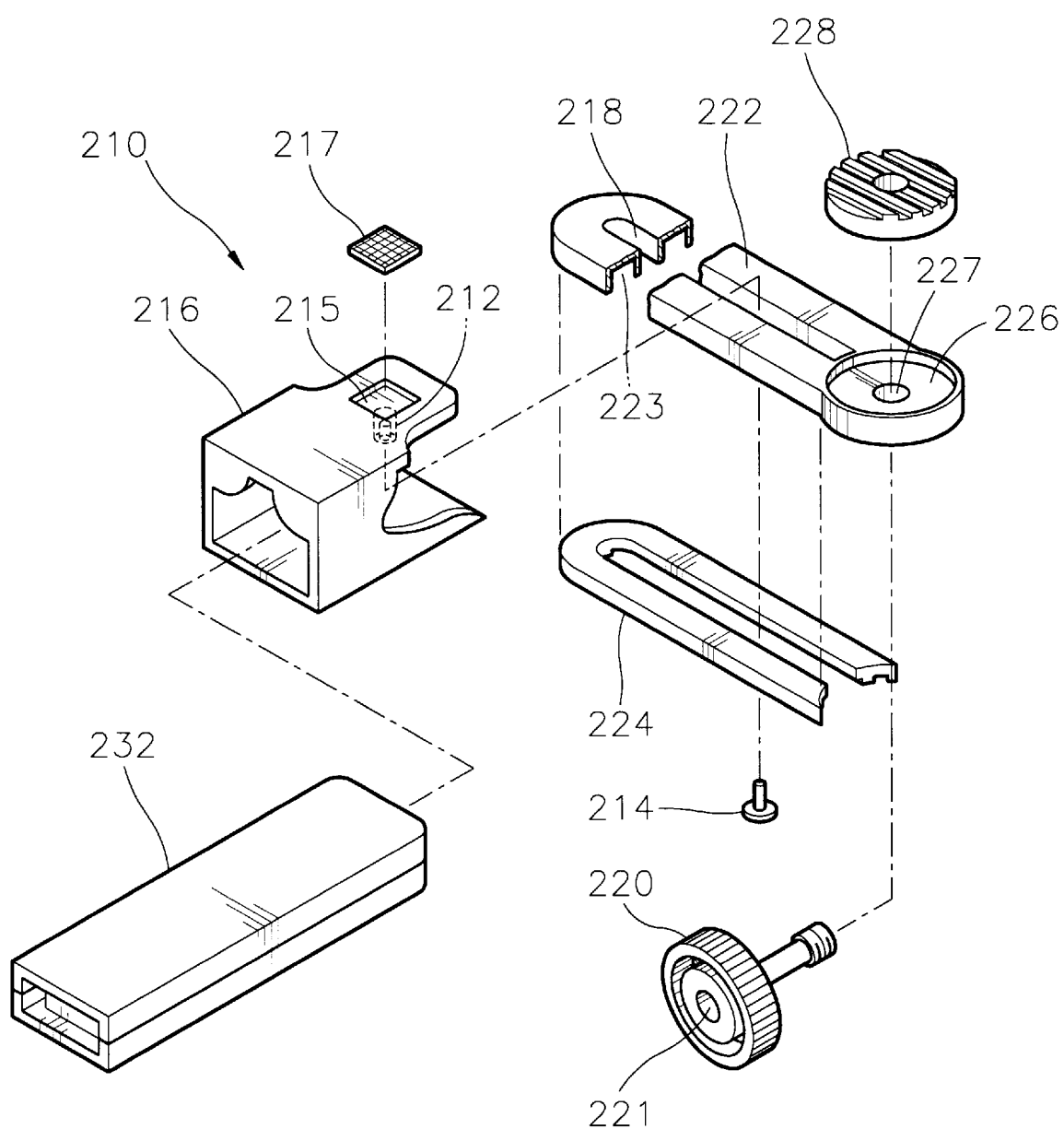
FIG. 4 is an exploded perspective view of the apparatus shown in FIG. 3, for explaining the relative positions of the fixing part and the adjusting part of the apparatus.
Figure 5:
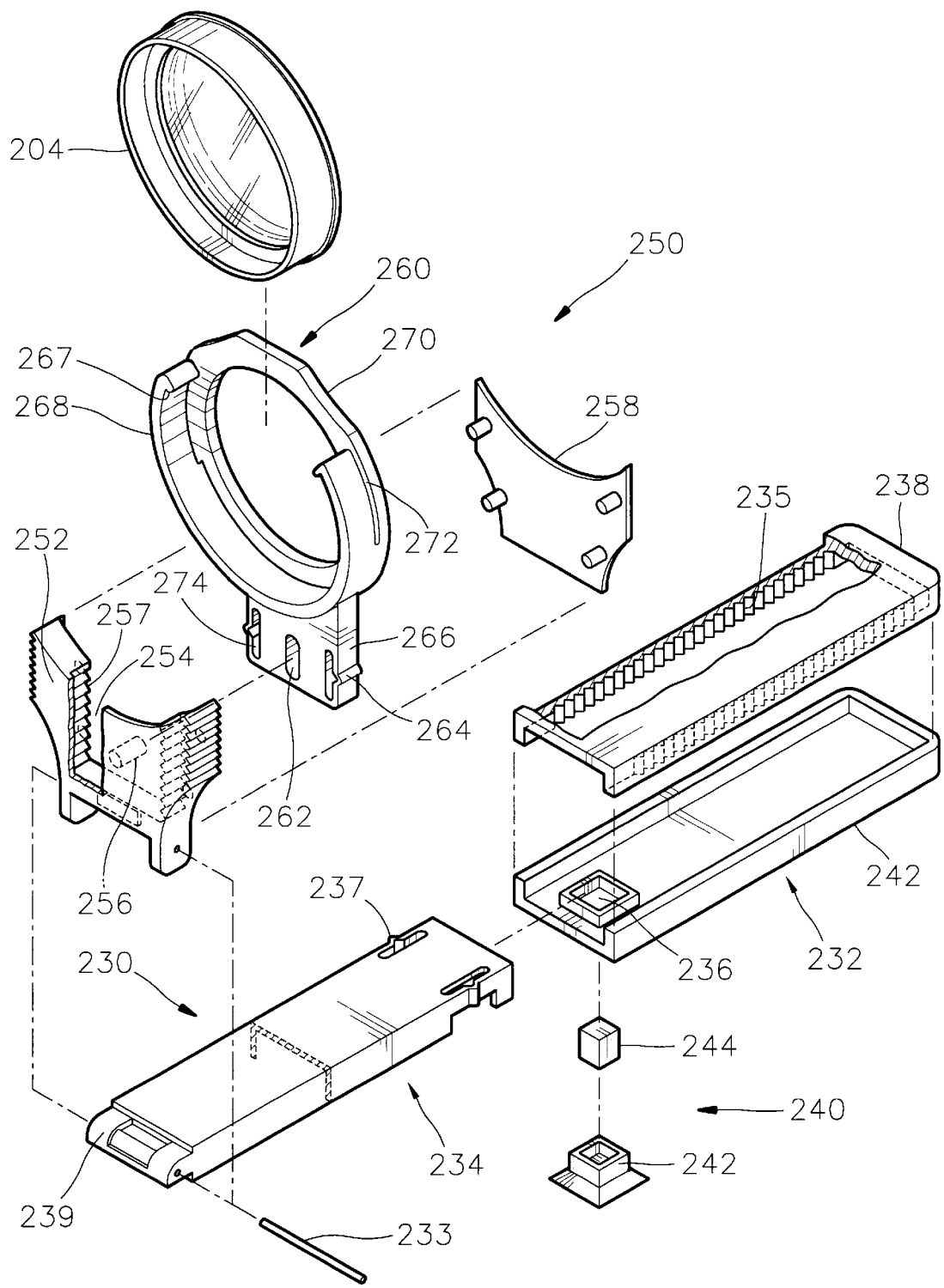
FIG. 5 is an exploded perspective view of the apparatus as shown in FIG. 3, for explaining the relative positions of the adjusting part and the filter holder assembly of the apparatus.

FIG. 3 illustrate and apparatus 200 for detachably mounting a lens filter onto a camera according to a first embodiment of the present invention, and FIGS. 4 & 5 are exploded perspective views of the apparatus.

As illustrated in the drawings, the apparatus 200 for fixing filter of camera according to the present embodiment includes a fixing part 210 which is fixed to an accessory mounting groove formed at the bottom surface of the camera, an adjusting part 230 which is slidably connected to fixing part 210 and adjusts the horizontal position of a filter 204 according to the distance between filter 204 and the camera lens so that the distance between the filter 204 and the camera lens is substantially constant, and a filter holder assembly 250 which is rotatably connected to the distal end of adjusting part 230 and adjusts the vertical position of filter 204 so that the vertical position of filter 204 is the same as the vertical position of camera lens.

As shown in FIG. 4, fixing part 210 includes a first guiding member 216 of which two opposite end portions are open, a fixing plate 222 which is rotatably and slidably connected to first guiding member 216 and a fixing screw 220 which is rotatably mounted on fixing plate 222 and demountably fastens through fixing plate 222 to the accessory mounting groove of the camera.

The section of first guiding member 216 has a rectangular hollow shape. First guiding member 216 includes a first guiding protrusion 212 protrusively formed on the bottom surface of the upper portion of first guiding member 216, a guiding pin 214 inserted into first guiding protrusion 212, a third groove 215 formed on the upper surface of the upper portion of first guiding member 216 and a third friction member 217 which is inserted into and attached to third groove 215 to prevent first guiding member 216 from sliding on the bottom surface of the camera. Third friction member 217 is made of rubber, polyurethane, etc. and makes contact with the bottom surface of the camera to prevent sliding with respect to the bottom surface of the camera.

Fixing plate 222 is slidably and rotatably connected with first guiding member 216. Fixing plate 222 includes a first longitudinal hole 218 formed along the length of fixing plate 222, a first groove 223 formed on the bottom surface of fixing plate 222, a second groove 226 formed at one end portion of fixing plate 222 in a circular shape, a first through hole 227 formed at the center portion of second groove 226, a first friction member 224 inserted into first groove 223, a second friction member 228 inserted into second groove 226 and a first fixing screw 220 rotatably inserted into first through hole 227 to fasten first fixing plate 222 to the accessory mounting groove of the camera.

First guiding protrusion 212 is inserted into first longitudinal hole 218. First fixing plate 222 rotates up to 180° about the first guiding protrusion, and slides across the bottom surface of the upper portion of first guiding member 216. At the bottom surface of first fixing screw 220, a first screw hole 221 which has the same diameter as that of the accessory mounting groove, is formed. Various accessories such as a tripod can be mounted through first screw hole 221.

First friction member 224 is inserted into first groove 223 of first fixing plate 222, and second friction member 228 is inserted into second groove 226. First and second friction members 224 and 226 are made of rubber, polyurethane, etc. The heights of third friction member 217, the upper portion of first guiding member 216 and second friction member 228 are the same.

A user rotates and slides first fixing plate 222 around first guiding protrusion 212 to adjust first guiding member 216 in parallel with the cylindrical camera lens holder assembly and to combine first fixing screw 220 with the accessory mounting groove of the camera.

As shown in FIG. 5, adjusting part 230 includes a first link 232 which is slidably combined with fixing part 210, a second link 234 which is slidably combined in first link 232 and a stopping portion 240 which is positioned in first link 232 and prevents the sliding of second link 234.

First link 232 is slidably inserted into first guiding member 216 and includes an upper plate 238 having a first rack 235 formed at the inner side wall of upper plate 238 with a predetermined length, and includes a lower plate 242 having a protrusive portion 236 having a through hole and being formed at one end portion of first link 232. When upper plate 238 is combined with lower plate 242, the front side portion of first link 232 is open.

Second link 234 has a parallelepiped shape of which a lower surface is open. At an outer side proximal end of second link 234, a first latch 237 which is combined with first rack 235, is formed and at the distal end of second link 234, a hinge 239 into which a hinge pin 233 is rotatably inserted, is formed. Second link 234 is slidably inserted into the distal end of first link 232 with the open surface of second link 234 facing downward. The separation of second link 234 from first link 232 is prevented by protrusive portion 236. First latch 237 of second link 234 combines with first rack 235 so that second link 234 slides into first link 232 at a regular interval. Since the inner portion of first latch 237 is hollow, first latch 237 can elastically move toward inner portion of first link 232 to slide on first rack 235.

Stopping part 240 includes a stopping button 242 which is slidably inserted into the through-hole of protrusive portion 236 and a fourth friction member 244 which is fixed on the upper surface of stopping button 242. Fourth friction member 244 is made of a material having a relatively large frictional coefficient and coefficient of elasticity such as sponge or rubber. If the user should push stopping button 242 of stopping part 240 when second link 234 and first link 232 should be combined, the sliding of second link 234 with respect to first link 232 would be prevented by fourth friction member 244 without an external force.

Filter holder assembly 250 includes a rotating member 252 which is rotatably mounted on adjusting part 230 and a filter holder 260 which is rotatably mounted on rotating member 252 and receives filter 204.

One end portion of rotating member 252 is rotatably combined with hinge 239 of second link 234 by hinge pin 233. At the inner portion of rotating member 252, a guiding groove 254 which receives filter holder 260, is formed. At the center portion of guiding groove 254, a second guiding protrusion 256 is formed. At an inner side wall of guiding groove 254, a second rack 257 is formed. Filter holder 260 is inserted into rotating member 252 and a cover 258 is attached to rotating member 252.

Filter holder 260 includes: a guiding bracket 266 having a guiding longitudinal hole 262 into which second guiding protrusion 256 is inserted, which is formed in the inner portion of guiding bracket 266, and a second latch 264 which combines with second rack 257 and slides on second rack 257; a first filter fixing bracket 268 which is connected with the upper end portion of guiding bracket 266 and includes fixing protrusion 267 for fixing filter 204; and a second filter fixing bracket 270 of a circular shape which is connected with the lower surface of first filter fixing bracket 268 and is positioned at the front surface of camera lens 202. Between first filter fixing bracket 268 and second filter fixing bracket 270, a filter groove 272 for receiving filter 204 is formed. First filter fixing bracket 268 has a cut-away ring shape larger than a semi-circular ring (that is, the cross section of first filter bracket 268 is that of a circular section of central angle, slightly greater than 180°, or a portion less than a half of ring is cut away) and has fixing protrusion 267 at the end portion thereof. Elastic longitudinal holes 274 are formed at both sides of guiding longitudinal hole 262 in guiding bracket 266.

The operation of apparatus 200 according to the present embodiment is described in detail below.

The apparatus 200 for detachably mounting a lens filter of a camera according to the present embodiment is mounted onto the camera through the combination of fixing screw 220 and the accessory mounting groove on the bottom surface of the camera. At this time, fixing screw 220 is positioned under the accessory mounting groove of the camera by sliding and rotating first fixing plate 222 around first guiding protrusion 212. First guiding member 216 slides along the length of first fixing plate 222 until the center portion of first guiding member 216 and the center portion of camera lens 202 coincide. Then, first fixing screw 220 is combined with the accessory mounting groove.

Figure 6:
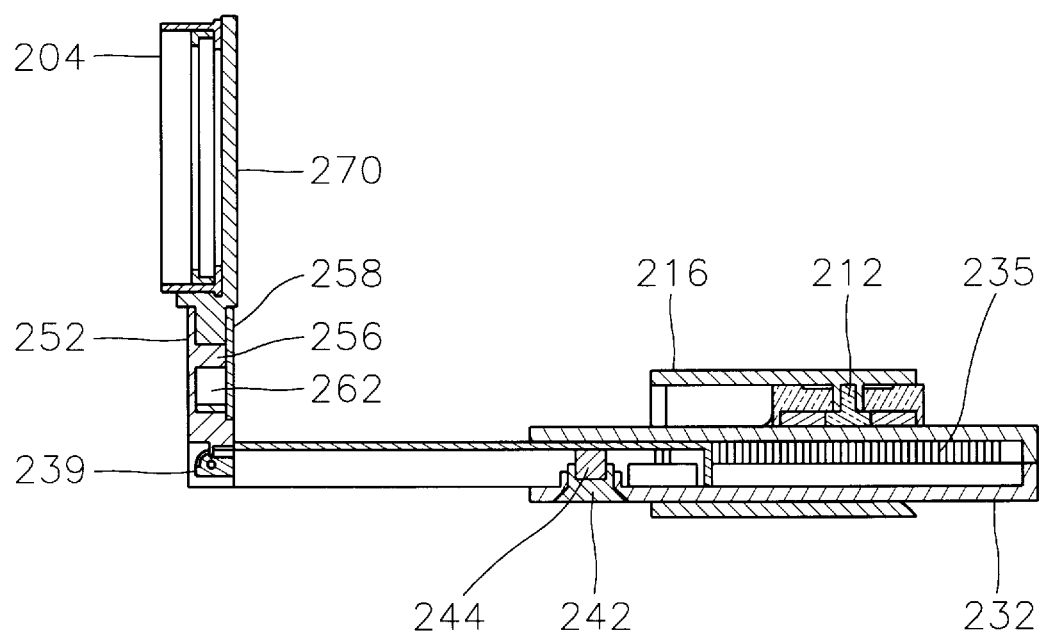
FIG. 6 is a cross-sectional view along the line A—A' in FIG. 3.

After first fixing plate 222 has been fastened to the camera, the length of adjusting part 230, which is defined by first and second links 232 and 234, is adjusted so that its length is the same with the distance between the rear surface of the camera and the filter. At this time, the length of adjusting part 230 is adjusted by sliding first link 232 with respect to first guiding member 216 and by sliding second link 234 with respect to first link 232. When the user pulls second link 234 with one hand, first latch 237 withdraws toward the inner portion of second link 234 while sliding on first rack 235, resulting in a sharp click (see FIGS. 5 & 6). Once, second link 234 has moved, first latch 237 is positioned at the ravine of first rack 235. Accordingly, second link 234 can be moved no further without application of an external force larger than the predetermined value.

After the position of second link 234 has been initially set, the position of second link 234 is fixed by pushing stopping button 242. When stopping button 242 has been pushed, fourth friction member 244 contacts with second link 234 to prevent the movement of second link 234.

When filter 204 is inserted into filter holder 260, the vertical position of filter holder assembly 250 may be higher or lower than the vertical position of camera lens 202. The user moves filter holder 260 upward to align the center of filter 204 with the center of camera lens 202. The position of filter holder 260 is fixed through the stopping operation of second rack 257 by second latch 264. The user may now take a picture using the camera and filter 204.

Figure 12:
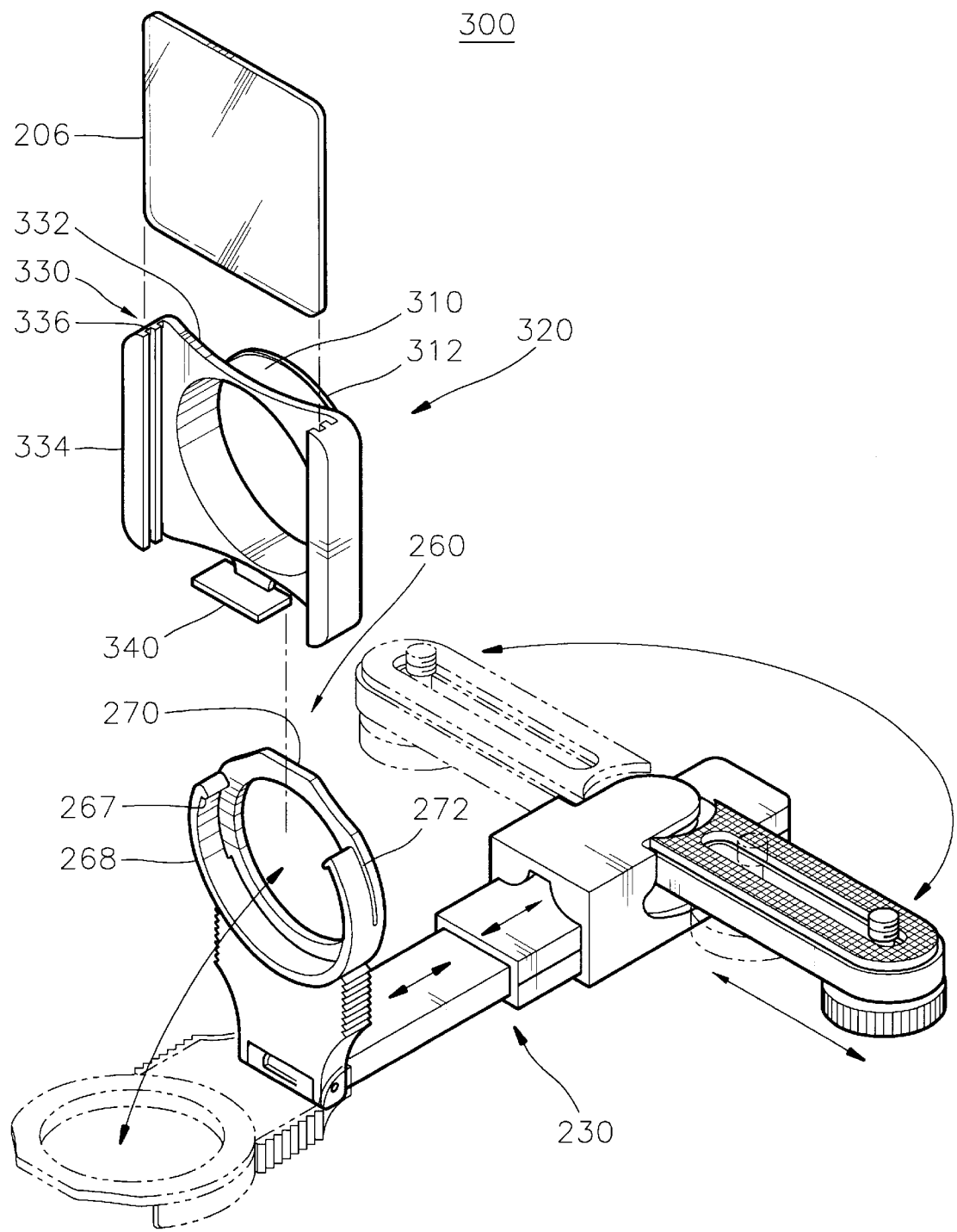
FIG. 12 is a perspective view for showing an example obtained by applying the filter holder assembly of the fourth embodiment to the apparatus for mounting the filter of the camera according to the third embodiment of the present invention.

As illustrated in FIG. 12, when camera lens 202 moves forward as in a zoom operation, camera lens 202 pushes filter holder 260. Then, rotating member 252 rotates around hinge 239 to allow camera lens 202 to move further. Damage onto either the camera or the apparatus of the present embodiment is thus avoided.

Embodiment 2

Figure 7:
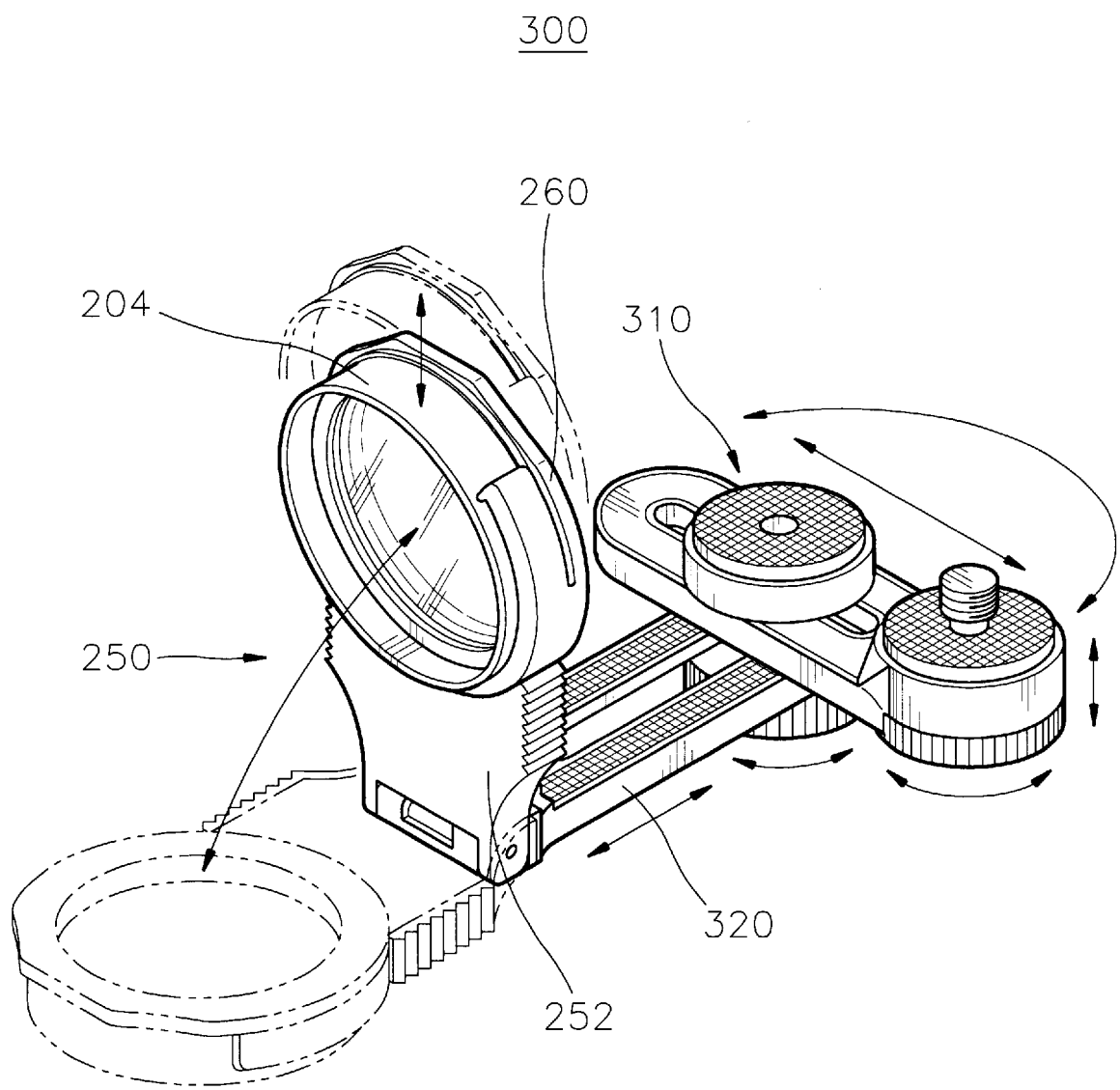
FIG. 7 is a perspective view of an apparatus for mounting the camera lens filter according to a second embodiment of the present invention.
Figure 8:
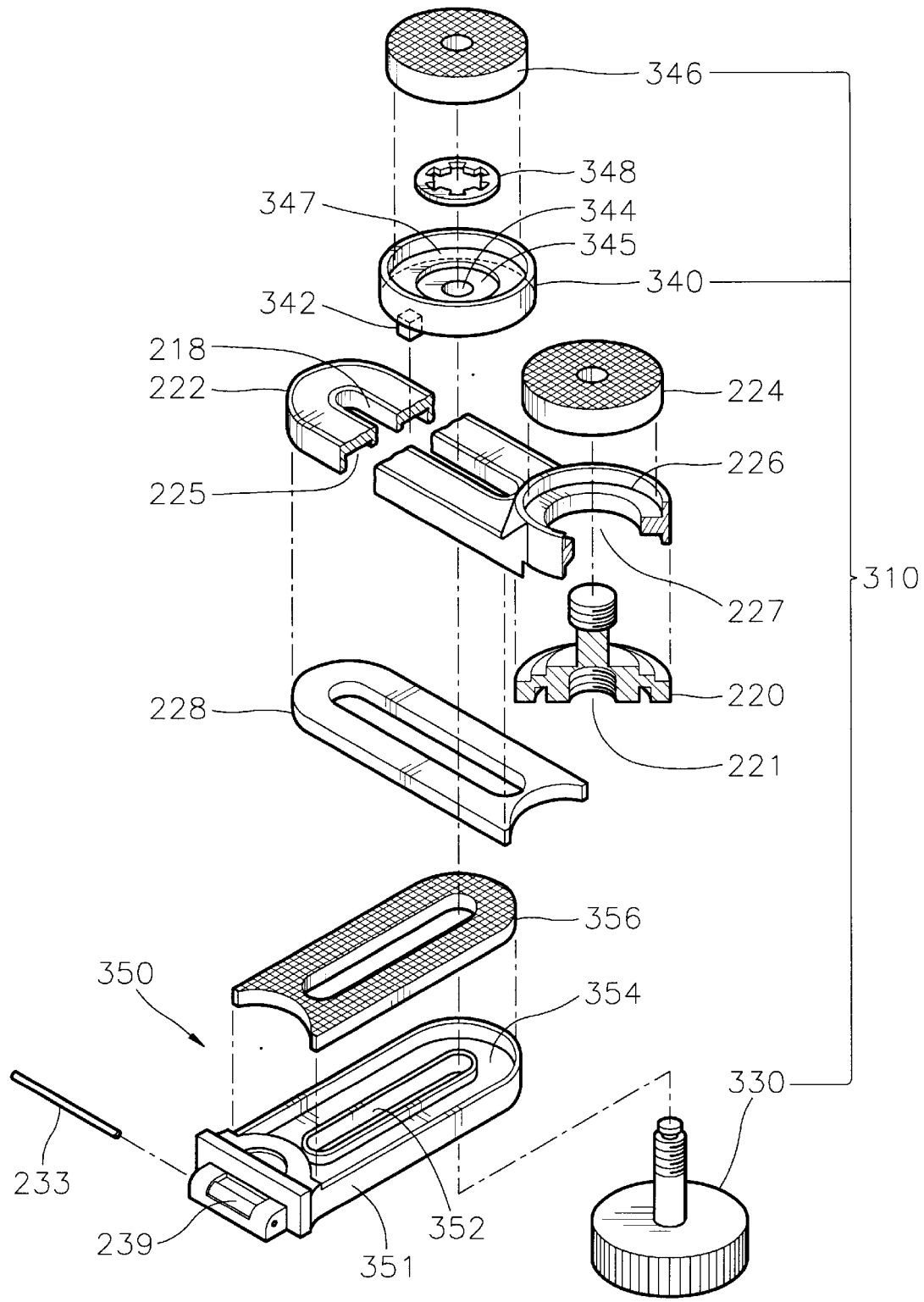
FIG. 8 is an exploded perspective view of the apparatus of FIG. 7, for showing the interconnection of the fixing part and the adjusting part of the apparatus.

FIG. 7 is a perspective view of an apparatus 300 for fixing filter for camera according to a second embodiment of the present invention and FIG. 8 is an exploded perspective view of a fixing part 310 and adjusting part 350 in the apparatus.

As shown in FIGS. 7 and 8, the apparatus 300 for detachably mounting a filter onto a camera in the present embodiment, includes fixing part 310 which is fixed to an accessory mounting groove formed at the bottom surface of the camera; adjusting part 350 which is slidably connected with fixing part 310 and adjusts the horizontal position of filter 204 according to the length of camera lens 202; and filter holder assembly 250 which is rotatably connected to one end portion of adjusting part 350 and receives filter 204 to align the vertical position of filter 204 with the vertical position of camera lens 202.

Apparatus 300 of the present embodiment has the same elements as apparatus 200 of the first embodiment except fixing part 210 and adjusting part 230. Therefore, an explanation of the structure and operation of the common to both will be omitted.

As illustrated in FIG. 8, fixing part 310 includes a second guiding member 320 and fixing plate 222. Second guiding member 320 includes: a second fixing screw 330, which may be slidably and rotatably inserted into first longitudinal hole 218; a fixing nut 340 which is positioned at the upper surface of fixing plate 222, has a stopping protrusion 342 at the bottom portion thereof and is combined with second fixing screw 330; and a fifth friction member 346, which is inserted into the upper surface of fixing nut 340.

Second fixing screw 330 passes through first longitudinal hole 218 and combines with fixing nut 340. At the center portion of fixing nut 340, a second screw hole 344 for combining with second fixing screw 330, is formed and at the inner side surface of the upper surface of fixing nut 340, a fifth groove 347 for receiving fifth friction member 346, is formed. At the inner portion of fifth groove 347, a fourth groove 345 is formed. A stopping ring 348 is inserted into fourth groove 345 for preventing the separation of second fixing screw 330 from fixing nut 340. The rotation of fixing nut 340 is prevented by the insertion of stopping protrusion 342 into first longitudinal hole 218. When fixing nut 340 is combined with second fixing screw 330, fixing nut 340 slides on the upper surface of fixing plate 222.

Fifth friction member 346 and third friction member 224 contact with the bottom surface of the camera and prevent the sliding of apparatus 300 for fixing filter for camera according to the present embodiment when the apparatus is fastened onto the bottom surface of the camera by means of first fixing screw 220. In addition, the height of fifth friction member 346 is the same as the height of third friction member 224. Fifth and third friction members 346 and 224 are comprised of a material having a relatively large frictional coefficient such as polyurethane, rubber, etc.

Third link 351 is slidably and rotatably connected between fixing plate 222 and second fixing screw 330. Third link 351 is provided with hinge 239 at its distal end portion and is connected thereto so that rotating member 252 can rotate around hinge pin 233. At the inner portion of third link 351, a second longitudinal hole 352 into which second fixing screw 330 is inserted, is formed along the length of third link 351. A sixth groove 352 is formed around second longitudinal hole 352 for receiving a sixth friction member 356, is formed. When second fixing screw 330 is combined with fixing nut 342, sixth friction member 356 contacts with second friction member 228 and third link 351 does not slide on fixing plate 222 due to the frictional coefficient between sixth friction member 356 and second friction member 228.

When second fixing screw 330 is released from fixing nut 340, third link 351 rotates and slides around second fixing screw 330 to adjust the horizontal position of filter 204 according to the length of camera lens 202. After the horizontal position of filter 204 is adjusted by the rotation and the sliding of third link 351, the horizontal position of filter 204 is fixed by tightening second fixing screw 330. Sixth friction member 356 is made from a material having relatively large frictional coefficient such as polyurethane, rubber, etc.

The connection of fixing plate 222 and third link 351 will be explained below.

Fixing plate 222 is positioned on the upper surface of third link 351 until first and second longitudinal holes 218 and 352 communicate with each other. After second fixing screw 330 is inserted into first and second longitudinal holes 218 and 352, fixing nut 340 is combined with second fixing screw 330. After combining second fixing screw 330 with fixing nut 340, stopping ring 348 is inserted into fourth groove 345 and fifth friction member 346 is inserted into fifth groove 347, through which fixing part 310 and adjusting part 350 are combined.

The operation of apparatus 300 according to the present embodiment will be explained, in detail.

Firstly, first fixing screw 220 is meshed with the accessory mounting groove of the camera. In order to position filter holder assembly 310 in front of camera lens 202, tightened second fixing screw 330 is rotated so that fixing plate 222 and third link 351 can slide and rotate around second fixing screw 330. Third link 351 is adjusted to be parallel with the cylinder of camera lens 202 by sliding and rotating fixing plate 222, and the position of filter holder assembly 250 in front of camera lens 202 is adjusted through sliding third link 351, after which second fixing screw 330 is tightened.

Figure 13:
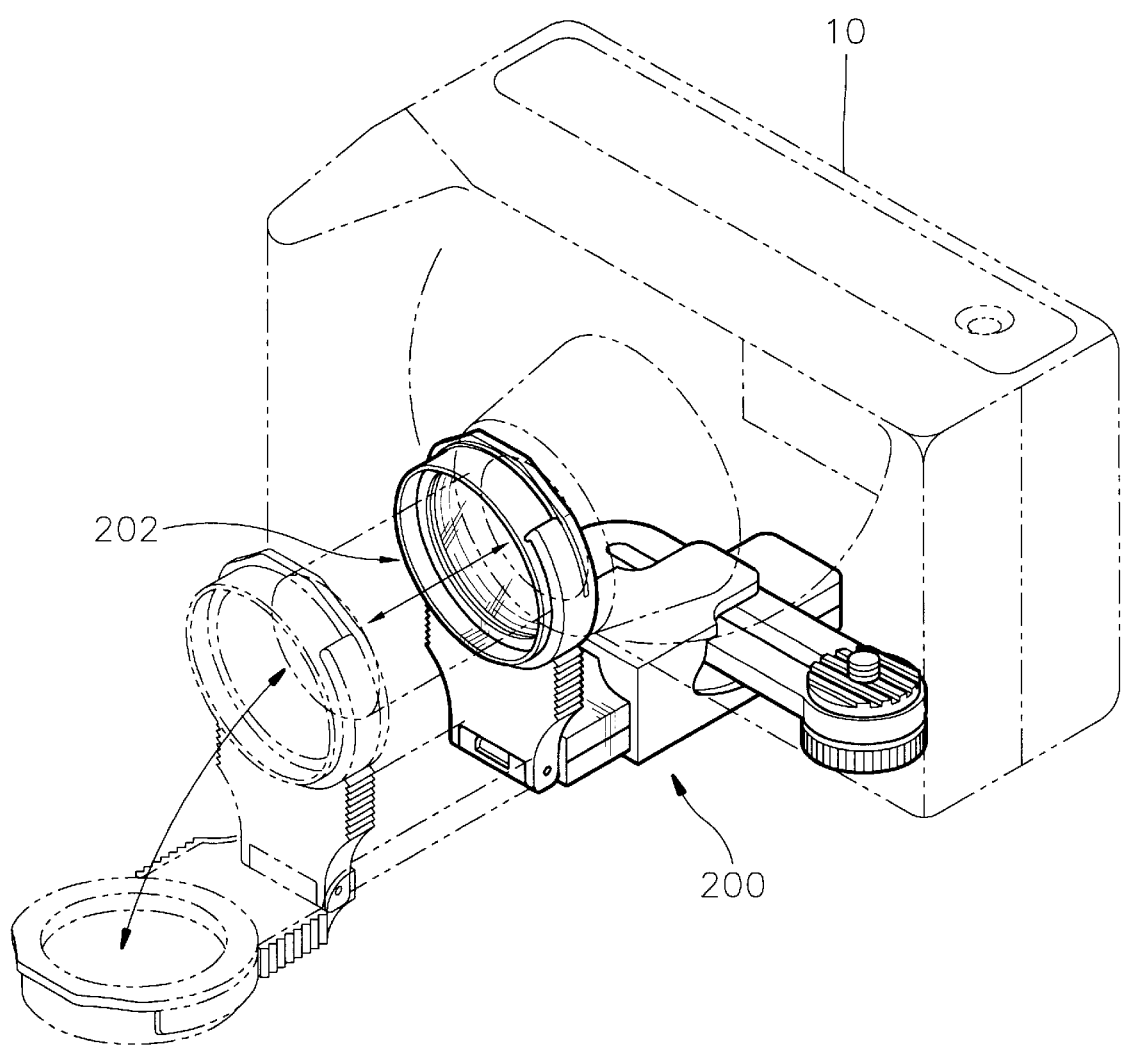
FIG. 13 is a perspective view for showing the mounting state of the apparatus for mounting the filter of the camera according to the first embodiment.

Through the above-mentioned process, filter holder assembly 250 is positioned in front of camera lens 202, as illustrated in FIG. 13. If the center of filter 204 does not coincide with the center of lens 202, filter holder 260 is moved up and down to match the height of filter 204 to the height of lens 202. After this process, the center of filter 204 and the center of lens 202 coincide with each other and the user may now take various technical pictures by inserting various filters into filter holder 260.

When the accessory mounting groove is positioned near the front surface of the camera or when the length of lens 202 is relatively short, the apparatus of the present embodiment may be adjusted as follows.

Figure 14:
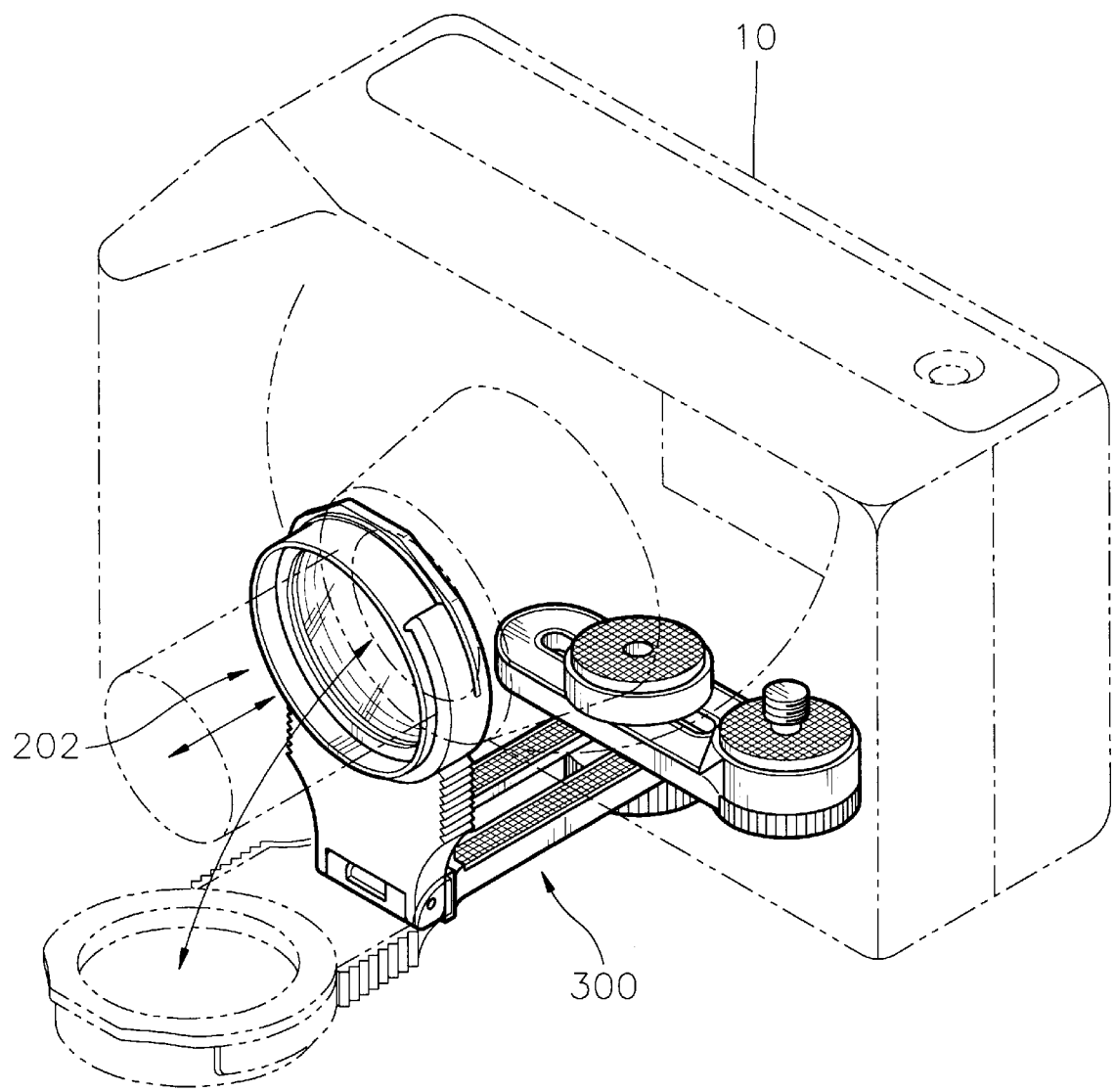
FIGS. 14 & 15 are perspective views for showing the mounting states of the apparatus for mounting the filter of the camera according to the second embodiment.
Figure 15:
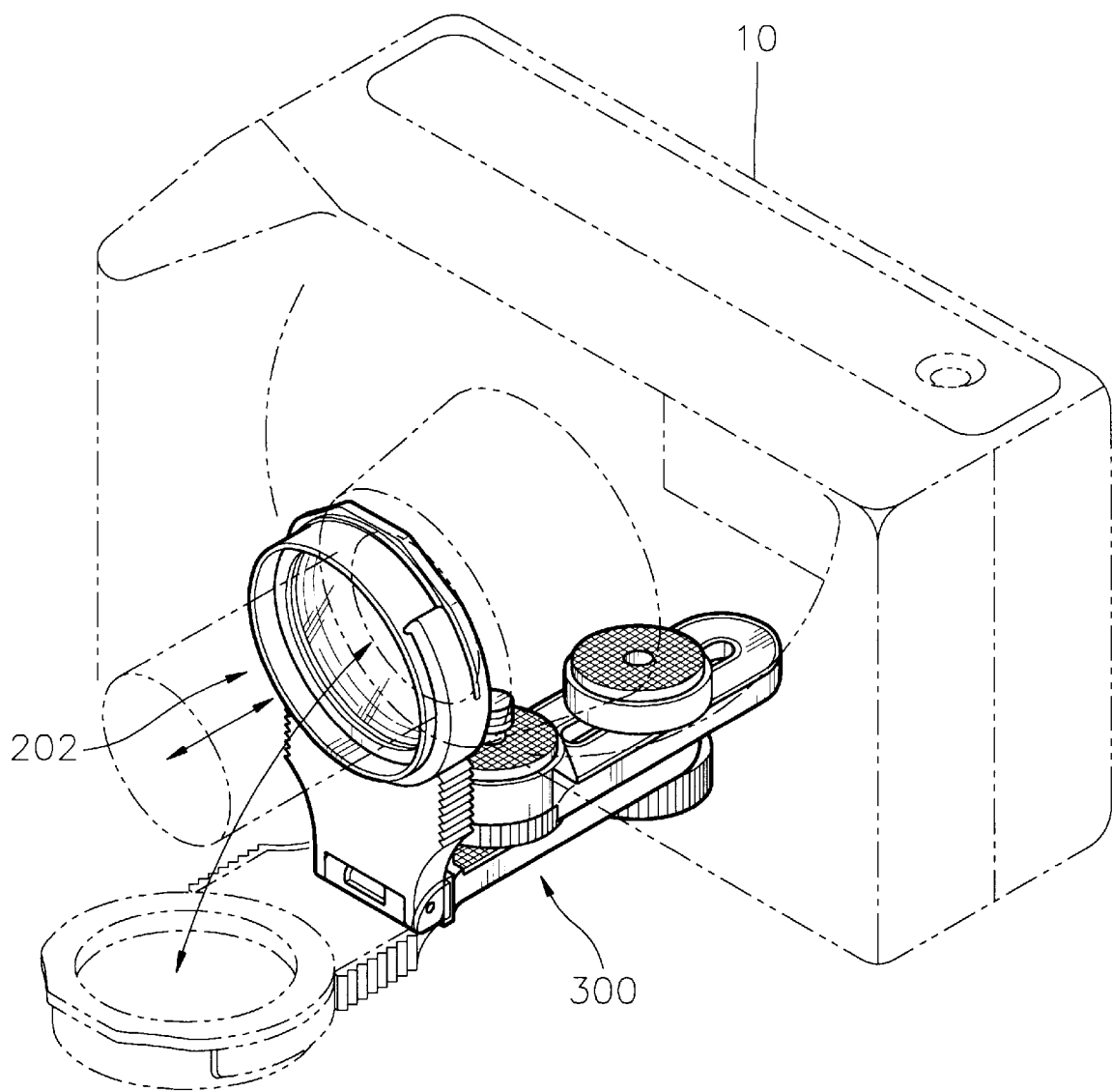
Figure 16:
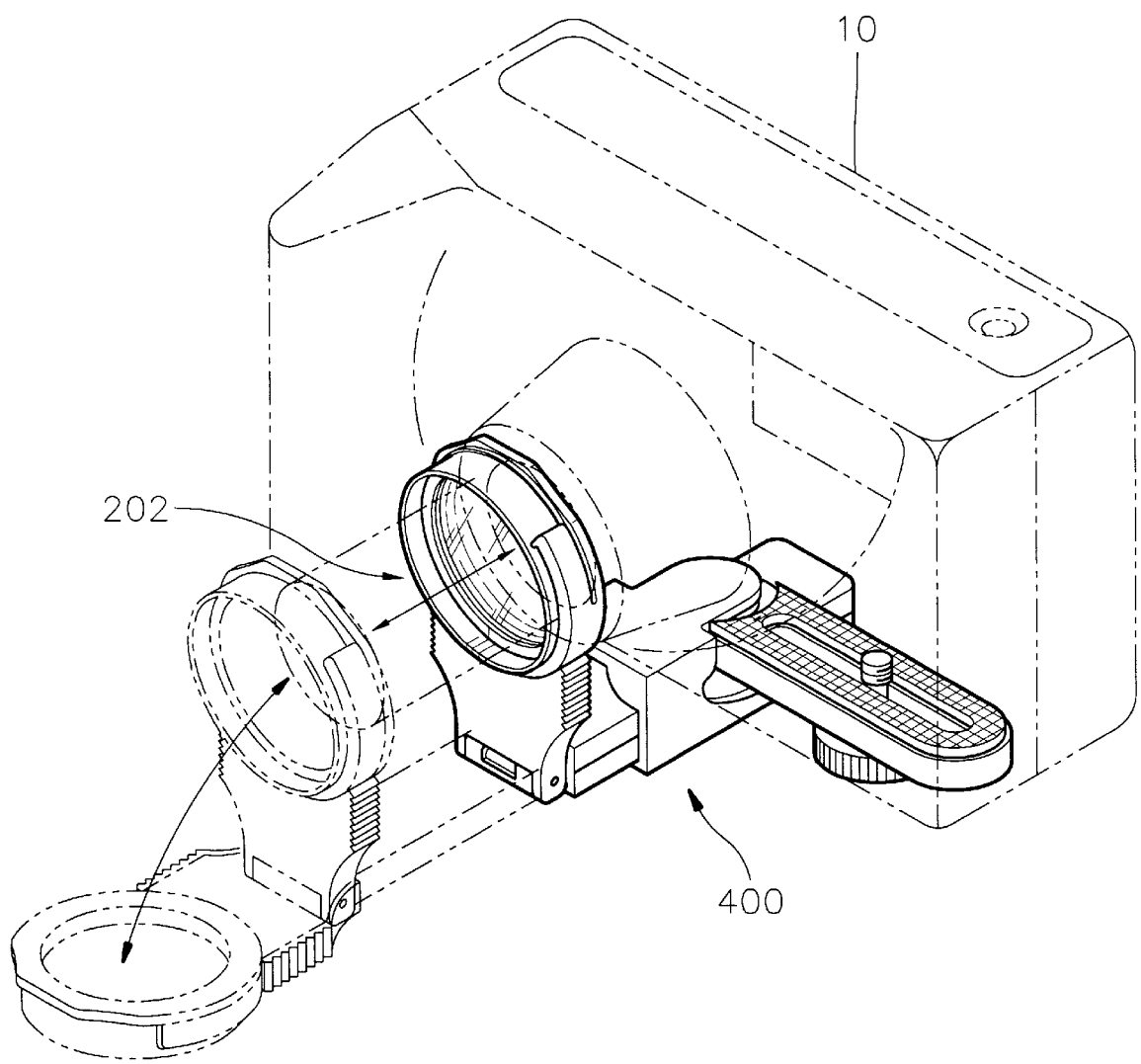
FIG. 16 is a perspective view for showing the mounting state of the apparatus for mounting the filter of the camera according to the third embodiment.

First fixing screw 220 is meshed with the accessory mounting groove and second fixing screw 330 is raised. Second fixing screw 330 is then released and fixing plate 222 is rotated, so that first fixing screw 220 approaches filter holder assembly 250. Second fixing screw 330 is re-tightened and the heights of filter 204 and lens 202 are adjusted to coincide with each other, as illustrated in FIG. 14.

Embodiment 3

Figure 9:
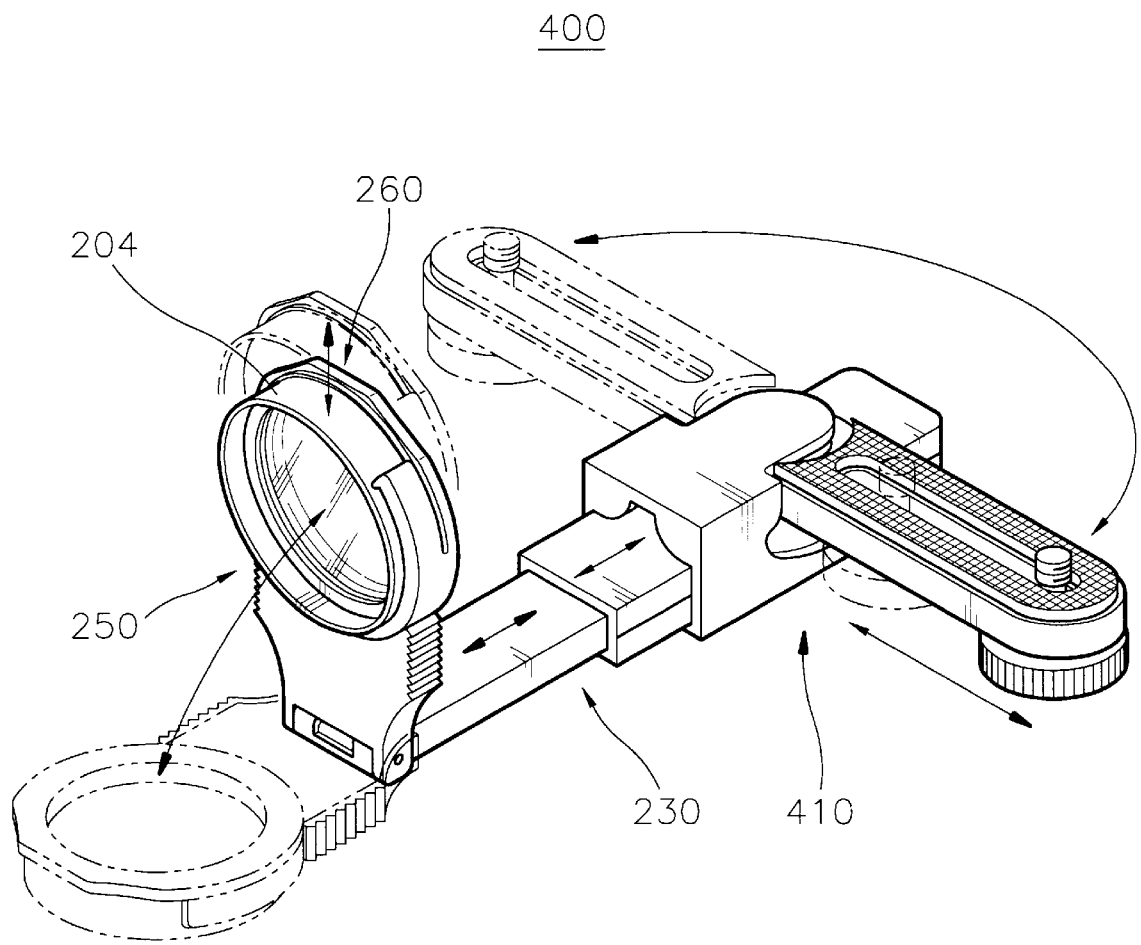
FIG. 9 is a perspective view of an apparatus for mounting a camera lens filter according to a third embodiment of the present invention.
Figure 10:
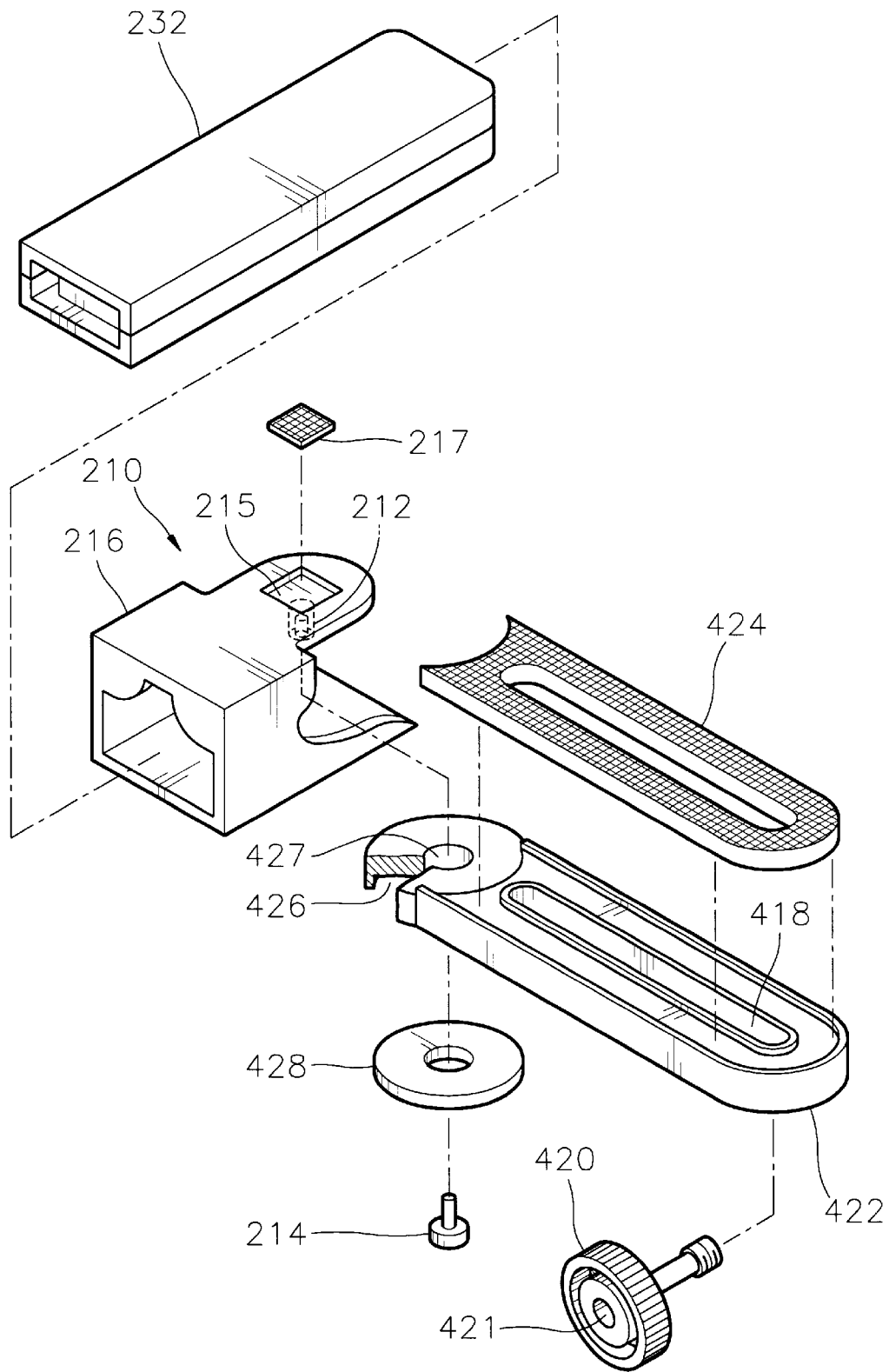
FIG. 10 is an exploded perspective view of the apparatus of FIG. 9, for showing the interconnection the fixing part and the adjusting part of the apparatus.

FIG. 9 is a perspective view of an apparatus 400 for fixing filter for camera according to a third embodiment of the present invention and FIG. 10 is an exploded perspective view for showing a fixing part 410 and adjusting part 230.

The apparatus 400 for detachably mounting a lens filter onto a camera according to the present embodiment, includes fixing part 410, which is fixed to an accessory mounting groove formed at the bottom portion of a camera; adjusting part 230 which is slidably connected with fixing part 310 and adjusts the horizontal position of filter 204 according to the distance between camera lens 202 and the camera; and filter holder assembly 250 which is rotatably connected with one end portion of adjusting part 230 and receives filter 204 to fit the position of filter 204 with the vertical position of camera lens 202.

Apparatus 400 of the present embodiment has the same elements as the apparatus of the first embodiment except fixing part 210. Therefore, an explanation of the structure and operation common to both embodiments will be omitted.

As shown in FIGS. 9 & 10, fixing part 410 includes: first guiding member 216 of which both ends are opened; a second fixing plate 422, which is rotatably and slidably combined with first guiding member 216; and a third fixing screw 420, which is rotatably mounted on second fixing plate 422 and mounts second fixing plate 422 onto the accessory mounting groove of the camera.

Second fixing plate 422 is rotatably connected with first guiding member 216. Second fixing plate 422 includes a third longitudinal hole 418, which is formed along the length of fixing plate 422; a seventh groove 423 formed around the upper surface of third longitudinal hole 418; an eighth groove formed at the bottom surface of one end portion of fixing plate in a circular shape; a second through hole 427 formed at the center portion of eighth groove 426; an eighth friction member 428 inserted into eighth groove 426; a seventh friction member 424 inserted into seventh groove 426; and a third fixing screw 420, which is rotatably and slidably inserted into third longitudinal hole 418 for mounting second fixing plate 422 onto the accessory mounting groove of the camera.

Second fixing plate 422 is connected with first guiding member 216 through the insertion of first guiding protrusion 212 into second through hole 427. Second fixing plate 422 rotates to the degree of 180° around first guiding protrusion 212 and third fixing screw 420 moves along second longitudinal hole 418. At the bottom surface of third fixing screw 420, a third screw hole 421 which has the same diameter as that of the accessory mounting groove, is formed. Various accessories, such as the tripod, may be mounted through third screw hole 421.

Seventh friction member 424 is inserted into seventh groove 423 of second fixing plate 422. Also, eighth friction member 428 is inserted into eighth groove 426. Seventh and eighth friction members 424 and 428 are made of rubber, polyurethane, etc. The heights of first friction member 217, the upper portion of first guiding member 216 and seventh friction member 424 are the same.

The user rotates and slides second fixing plate 422 around first guiding protrusion 212 to adjust first guiding member 216 and the cylinder of the camera lens in parallel. Third fixing screw 420 may then be combined with the accessory mounting groove of the camera.

Embodiment 4

Figure 11:
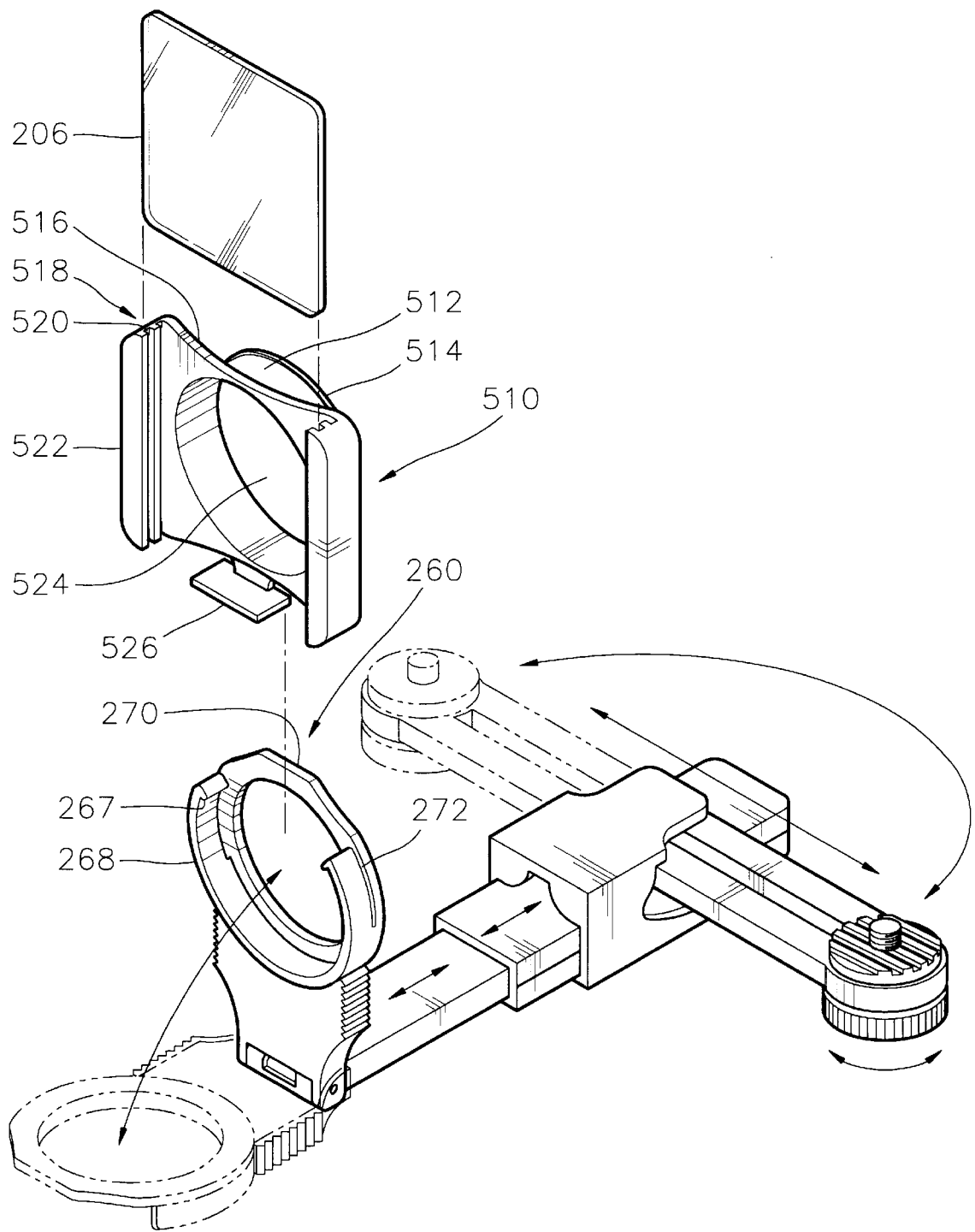
FIG. 11 is a perspective view of an apparatus for mounting a camera lens filter according to a fourth embodiment of the present invention.

FIG. 11 illustrates an apparatus 500 for detachably mounting a lens filter onto a camera according to a fourth embodiment of the present invention.

The apparatus 500 according to the present embodiment, includes: fixing part 210 fixed onto an accessory mounting groove formed at the bottom surface of the camera; adjusting part 230 which is slidably connected with fixing part 210 and adjusts the horizontal position of filter 204 according to the distance between camera lens 202 and filter 204; filter holder assembly 250 which is rotatably connected to one end portion of adjusting part 230 and receives filter 204 to fit the position of filter 204 with the vertical position of camera lens 202; and a filter mounting part 510 for mounting a rectangular filter onto filter holder assembly 250.

Apparatus 500 according to the present embodiment, has the same elements as the apparatus of the first embodiment except filter mounting part 510. Therefore, an explanation of the structure and function of elements common to both embodiments will be omitted.

As shown in FIG. 11, filter mounting part 510 includes: a third filter fixing bracket 512, which is fixed to first filter fixing bracket 268 of filter holder 260; and a fourth filter fixing bracket 518, which is connected with the front end portion of third filter fixing bracket 512, for receiving and mounting a plurality of rectangular filters 206.

Third filter fixing bracket 512 is formed in a circular shape and has a filter mounting protrusion 514 formed at one end portion thereof, which is inserted into filter groove 272. Fourth filter fixing bracket 518 includes: a body bracket 516 which is connected with the front end portion of third filter fixing bracket 512; a filter inserting bracket 522 which is protruded from both end portions of body bracket 516 and has a plurality of filter slits 520 for receiving and mounting rectangular filter 206; and a stopping protrusion 526 which is protrusively extended at the bottom end portion of body bracket 516 to prevent the separation of rectangular filter 206. Rectangular filter 206 is inserted into and mounted on filter slits 520 and cannot further descend due to stopping protrusion 526.

According to apparatus 500 for fixing filter for camera in this embodiment, when the user intends to use rectangular filter 206, he should remove circular filter 204 from filter holder 270 and insert and mount rectangular filter 206 into filter mounting part 510. At this state, filter mounting member 330 is inserted into filter holder 270 and combined therewith. Alternatively, the user may remove circular filter 204 from filter holder 270 and inserts filter mounting part 510 into which rectangular filter is not inserted, into filter holder 270. One or more rectangular filters 206 may then be inserted into filter slits 520.

After inserting filter mounting part 510 having rectangular filter 206, into filter holder 270, the same method explained for the apparatus according to the first embodiment of the present invention, can be applied. Filter mounting part 510 of apparatus 500 may used in conjunction with apparatus 200, 300, and 400 according to the first, second and third embodiment of the present invention. FIG. 12 is a perspective view for showing an apparatus in which filter mounting part 510 of apparatus 500 is used in conjunction with the apparatus 400 according to the third embodiment of the present invention.

The apparatus of the present invention may be utilized irrespective of the type of the camera, the position of the accessory mounting groove of the camera, and the length and the position of the camera. Moreover, several filters may be simultaneously used.

Although the preferred embodiment of the invention has been described, it is understood that the present invention should not be limited to the preferred embodiment, but various changes and modifications can be made by one skilled in the art within the spirit and scope of the invention as hereinafter claimed.

What is claimed is:

1. An apparatus for mounting a filter onto a camera, said apparatus comprising:
   a fixing means for fixing the apparatus to an accessory mounting groove formed at a bottom portion of the camera, said fixing means including i) a guiding member having a first guiding protrusion which is protrusively formed at a bottom surface of an upper portion of said guiding member, two opposite ends of said guiding member being opened, ii) a fixing plate which is rotatably and slidably connected to said guiding member and has a longitudinal hole formed at an inner portion of said fixing plate along a length direction of said fixing plate for receiving said first guiding protrusion, a first groove formed at a bottom surface around said longitudinal hole, a second groove formed at one end portion of said fixing plate and a through hole formed at a center of said second groove, and iii) a fixing screw which passes through said through hole and is rotatable connected to said fixing plate, for combining said fixing plate with said accessory mounting groove of said camera;

an adjusting means, slidably connected with said fixing means and provided with a hinge at one end portion of said adjusting means, for adjusting a horizontal position of a filter according to a distance variation between a camera lens and the camera; and a filter holder assembly for receiving said filter, said filter holder assembly being rotatably connected to said hinge.

2. An apparatus for detachably mounting a filter onto a camera as claimed in claim 1, wherein guiding member a third groove formed on an upper surface of an upper portion of said guiding member, a cross section of said guiding member has a hollow rectangular shape, and said fixing means has a first friction member which is inserted into said first groove, a second friction member which is inserted into said second groove; and a third friction member inserted into said third groove.

3. An apparatus for detachably mounting a filter onto a camera as claimed in claim 1, wherein said adjusting means comprises:

a first link including an upper plate having a first rack formed at an inner wall of said upper plate and a lower plate which combines with said upper plate, a front side portion of said first link being opened and said first link being slidably coupled with said guiding member when said upper plate combines with said lower plate; and a second link having a first latch which movably combines with said first rack and is formed at an outer wall of said second link, and said hinge being formed to one end portion of said second link, said filter holder assembly being rotatably connected to said hinge.

4. An apparatus for detachably mounting a filter onto a camera as claimed in claim 3, wherein said adjusting part further comprises:

a protrusive portion protrusively formed at a bottom surface of said first link, the protrusive portion having a through hole;

a stopping button which is slidably inserted into the through hole; and a stopping portion having a fourth friction member attached to an upper surface of said stopping button for stopping a movement of said first link.

5. An apparatus for detachably mounting to a filter to a camera, said apparatus comprising:

a fixing means for fixing the apparatus to an accessory mounting groove formed at a bottom portion of the camera;

an adjusting means, slidably connected with said fixing means and provided with a hinge at one end portion of said adjusting means, for adjusting a horizontal position of a filter according to a distance variation between a camera lens and the camera; and a filter holder assembly for receiving said filter, said filter holder assembly being rotatable connected to said hinge;

said fixing means comprising (i) a guiding member having a first guiding protrusion which is protrusively formed at a bottom surface of an upper portion of said guiding member, both ends of said guiding member being opened;

(ii) a fixing plate having a longitudinal hole formed in said fixing plate and along a length direction of said fixing plate, a first groove formed at an upper surface around said longitudinal hole, a second groove formed at one side portion of said fixing plate and a through hole formed at a center portion of said second groove for receiving said first guiding protrusion, said fixing plate being rotatably connected to said guiding member;

and (iii) a fixing screw, rotatably and slidably passing through the longitudinal hole, for combining said fixing plate with the accessory mounting groove of said camera.

6. An apparatus for detachably mounting a filter onto a camera as claimed in claim 5, wherein guiding member a third groove formed on an upper surface of an upper portion of said guiding member, a cross section of said guiding member has a hollow rectangular shape, and said fixing means has a first friction member which is inserted into said first groove, a second friction member which is inserted into said second groove and a third friction member inserted into said third groove.

7. An apparatus for mounting a filter to a camera, said apparatus comprising:

a fixing means for fixing the apparatus to an accessory mounting groove formed at a bottom portion of the camera;

an adjusting means, slidably connected with said fixing means and provided with a hinge at one end portion of said adjusting means, for adjusting a horizontal position of a filter according to a distance variation between a camera lens and the camera; and a filter holder assembly for receiving said filter, said filter holder assembly being rotatable connected to said hinge wherein said fixing means includes:

a fixing plate having a first longitudinal hole formed at an inner portion of said fixing plate and along a length direction of said fixing plate, a first groove formed at a lower surface around said first longitudinal hole, a second groove formed at one end portion of said fixing plate and a through hole formed at a center portion of said second groove, a first fixing screw which passes through said through hole and is rotatably connected to said fixing plate, for combining said fixing plate with said accessory mounting groove of said camera, and a guiding member having a second fixing screw which is rotatably and slidably inserted into the first longitudinal hole and a fixing nut which combines with said second fixing screw and has a third groove formed at an upper surface of said fixing nut, said fixing nut being positioned at an upper surface of said fixing plate.

8. An apparatus for detachably mounting a filter onto a camera as claimed in claim 7, wherein said guiding member comprises:

a first friction member inserted into said first groove;

a second friction member inserted into said second groove;

a third friction member inserted into said third groove; and a stopping ring inserted between said third friction member and said fixing nut for preventing a separation of said second fixing screw from said fixing nut, a fourth groove for receiving said stopping ring being formed at an inner portion of said third groove.

9. An apparatus for detachably mounting a filter onto a camera as claimed in claim 7, wherein said adjusting means has:

a second longitudinal hole formed along a length direction of said adjusting means, for receiving said second fixing screw, a fifth groove formed at an upper surface of said adjusting means around said second longitudinal hole, said hinge being formed at one end portion of said adjusting part, and a fourth friction member being inserted into said fifth groove and making in contact with a lower surface of said fixing plate.

10. An apparatus for detachably mounting a filter to a camera, said apparatus comprising:

a fixing means for fixing the apparatus to an accessory mounting groove formed at a bottom portion of the camera;

an adjusting means, slidably connected with said fixing means and provided with a hinge at one end portion of said adjusting means, for adjusting a horizontal position of a filter according to a distance variation between a camera lens and the camera; and a filter holder assembly for receiving said filter, said filter holder assembly being rotatable connected to said hinge, wherein said filter holder assembly includes:

a rotating member which is rotatably connected to said hinge and includes a guiding groove, a second guiding protrusion formed at an inner portion of said guiding groove, a second rack formed at an inner wall of said guiding groove and a cover combined with said guiding groove, a guiding bracket including a guiding longitudinal hole for receiving said second guiding protrusion and a second latch which is formed at an outer portion of said guiding bracket and is slidably combined with said second rack, and a filter holder for rotatably receiving said filter, said filter holder having a first filter fixing bracket which is connected to an upper end portion of said guiding bracket and includes a fixing protrusion for fixing said filter, and a second filter fixing bracket which is connected with said first filter fixing bracket at a bottom surface thereof and is positioned in front of said camera lens, a filter groove being formed between said first filter fixing bracket and said second filter bracket so as to receive said filter.

11. An apparatus for detachably mounting a filter onto a camera as claimed in claim 10, said filter fixing means further comprising:

a third filter fixing bracket inserted between said first filter fixing bracket of said filter holder and said second filter fixing bracket; and a rectangular filter mounting means which is connected with a front end portion of said third filter fixing bracket and includes a fourth filter fixing bracket for receiving and mounting a rectangular filter.

12. An apparatus for detachably mounting a filter onto a camera as claimed in claim 11, wherein said third filter fixing bracket has a circular shape and includes a filter mounting protrusion formed at one end portion of said third filter fixing bracket and inserted between said first filter fixing bracket and said second filter fixing bracket.

13. An apparatus for detachably mounting a filter onto a camera as claimed in claim 11, wherein said fourth filter fixing bracket comprises:

a body bracket which is connected to a front end portion of said third filter fixing bracket;

a filter inserting bracket which is protruded from both end portions of said body bracket and includes a plurality of filter slits for receiving and mounting said rectangular filter; and a stopping protrusion which is protrusively extended from a lower end portion of said body bracket for prevention a separation of said rectangular filter.

14. An apparatus for detachably mounting a filter to a camera having an accessory mounting groove formed at its bottom surface and an objective lens, said apparatus comprising:

a fixing means for fixing the apparatus to the accessory mounting groove;

an adjusting means having a proximal end and a distal end, the distal end being slidably connected with said fixing means and provided with a hinge at the distal end portion of said adjusting part, for adjusting a horizontal position of a filter so that distance between the filter and the objective lens is substantially constant; and a filter holder assembly for receiving said filter, said filter holder assembly being rotatably connected to said hinge, wherein said fixing means has:

a guiding member having a first guiding protrusion which is protrusively formed at a bottom surface of an upper portion of said guiding member, two opposite ends of said guiding member being opened, a fixing plate which is rotatable and slidably connected to said guiding member and has a longitudinal hole formed at an inner portion of said fixing plate along a length direction of said fixing plate for receiving said first guiding protrusion, a first groove formed at a bottom surface around said longitudinal hole, a second groove formed at one end portion of said fixing plate and a through hole formed at a center of said second groove, and a fixing screw which passes through said through hole and is rotatable connected to said fixing plate, for combining said fixing plate with said accessory mounting groove of said camera.

* * * * *